(12) United States Patent
Chang et al.

(10) Patent No.: US 10,643,086 B1
(45) Date of Patent: May 5, 2020

(54) ELECTRONIC DEVICE UNLOCKING METHOD UTILIZING ULTRASOUND IMAGING AND ELECTRONIC DEVICE UTILIZING THE SAME

(71) Applicant: NANNING FUGUI PRECISION INDUSTRIAL CO., LTD., Nanning (CN)

(72) Inventors: Wen-Hsin Chang, New Taipei (TW); Chang-Te Wu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/442,980

(22) Filed: Jun. 17, 2019

Related U.S. Application Data

(63) Continuation-in-part of application No. 16/211,741, filed on Dec. 6, 2018, now Pat. No. 10,387,111.

(51) Int. Cl.
*G06K 9/00* (2006.01)
*G06F 21/32* (2013.01)

(52) U.S. Cl.
CPC ......... *G06K 9/00885* (2013.01); *G06F 21/32* (2013.01); *G06K 9/0002* (2013.01); *G06K 9/00255* (2013.01)

(58) Field of Classification Search
CPC ........... G06K 9/008851; G06K 9/0002; G06K 9/00255; G06K 21/32
See application file for complete search history.

(56) References Cited

U.S. PATENT DOCUMENTS

| | | | |
|---|---|---|---|
| 2013/0141366 A1* | 6/2013 | Ritter | G06F 3/041 345/173 |
| 2016/0277925 A1* | 9/2016 | Bengtsson | H04B 11/00 |
| 2018/0357470 A1* | 12/2018 | Yang | G06K 9/00255 |
| 2019/0050618 A1* | 2/2019 | Khuri-Yakub | A61B 5/0816 |

* cited by examiner

*Primary Examiner* — Regina N Holder
(74) *Attorney, Agent, or Firm* — ScienBiziP, P.C.

(57) ABSTRACT

A device unlocking method utilizing ultrasound imaging. A device detects a cavity structure of a user using ultrasound imaging and utilizes a cavity model of the cavity structure for biometrics authentication. The cavity model of the user be stored in a mass storage and forms a basis for similarity comparison with other ultrasound detected cavity structures. The device allows device unlocking when a subsequently detect cavity structure matches the cavity model.

8 Claims, 9 Drawing Sheets

ELECTRONIC DEVICE UNLOCKING METHOD UTILIZING ULTRASOUND IMAGING AND ELECTRONIC DEVICE UTILIZING THE SAME

CROSS-REFERENCE TO RELATED APPLICATIONS

This application is a continuation in part of U.S. application Ser. No. 16/211,741, entitled "ELECTRONIC DEVICE AND METHOD FOR ADJUSTING SOUND", filed on Dec. 6, 2018. The entirety of each of the above-mentioned patent applications is hereby incorporated by reference herein.

FIELD

The disclosure relates to computer techniques, and more particularly to electronic device unlocking.

BACKGROUND

Smart terminals such as mobile phones, computers, smart watches and wearable devices have a screen locking function in order to better ensure the security of users' privacies and data. Various existing screen unlocking, such as character password unlocking, fingerprint recognition unlocking, and face unlocking, is not designed to address all aspects of privacy challenges. The character password unlocking may be problematic due to possibilities of forgetting the password or stealing of the password by others. Fingerprint recognition unlocking may be problematic due to finger injury and unavailability of the fingerprint recognition. Face unlocking may be difficult due to changing user appearance such as fat or thin getting faces.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
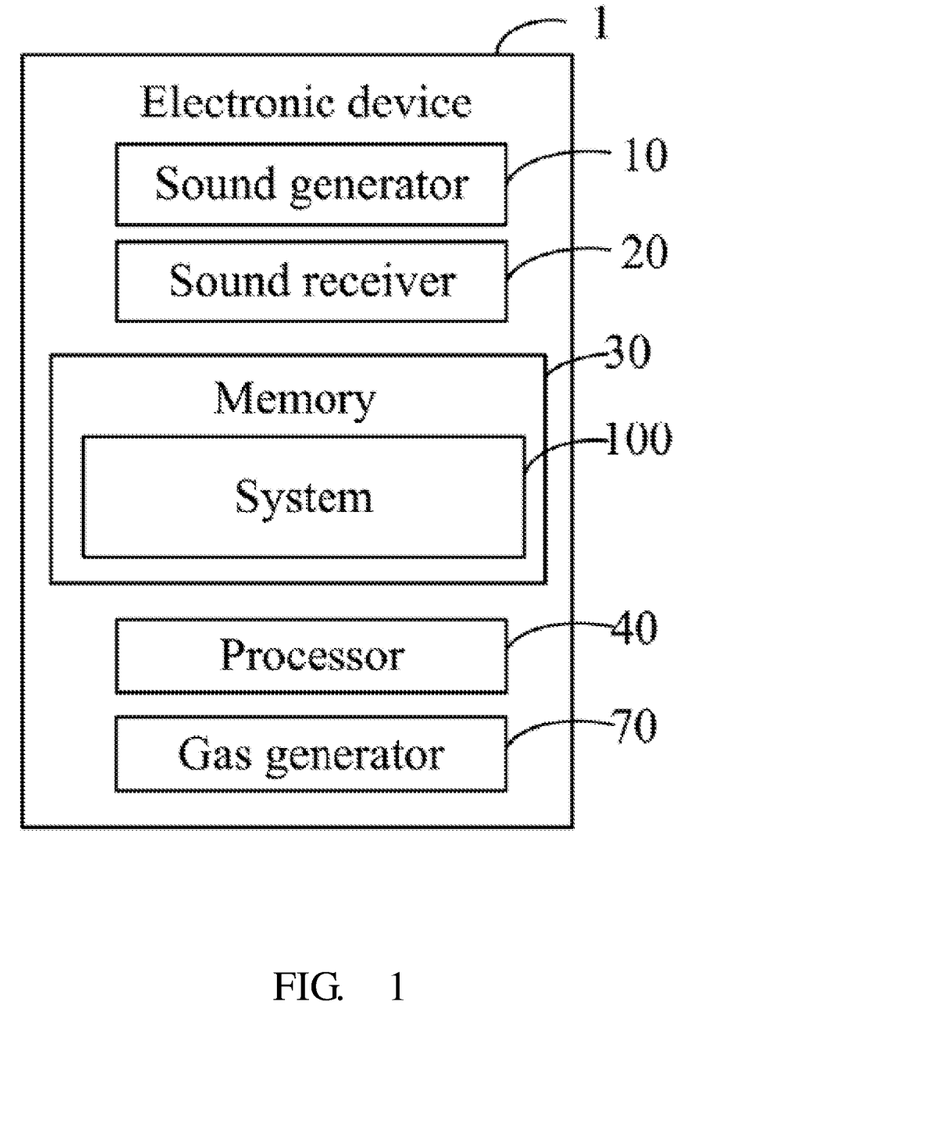
FIG. 1 is a block diagram of an embodiment of an electronic device according to the present disclosure.

FIG. 1 illustrates an embodiment of an electronic device 1. The electronic device 1 can be a smart phone or a table computer.

Figure 2:
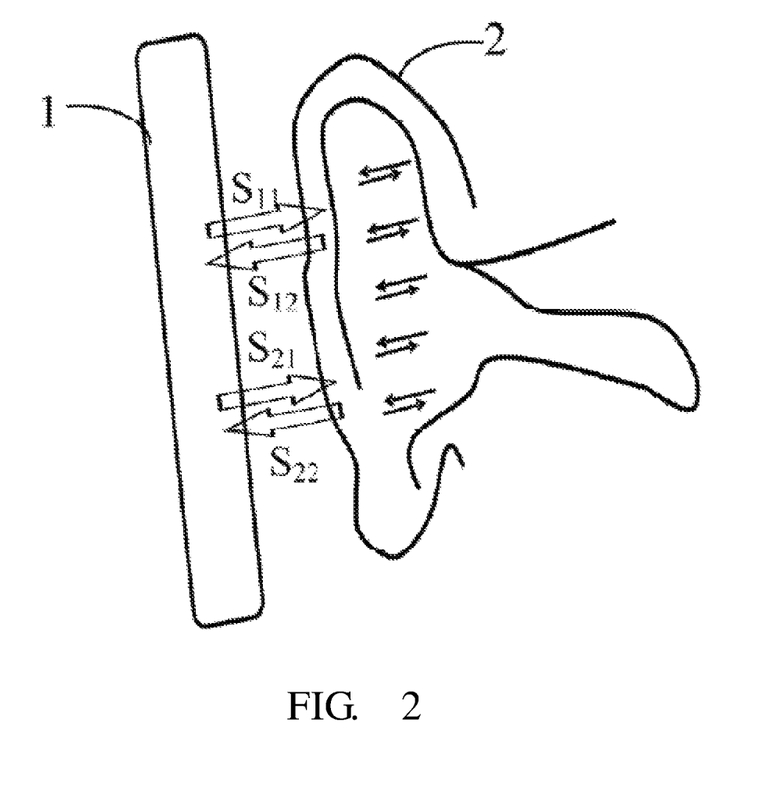
FIG. 2 is a diagrammatic view of sound paths when the electronic device of FIG. 1 being placed adjacent to an auricle of an audience.

The electronic device 1 includes at least one sound generator 10 and a sound receiver 20. The sound generator 10 sends sound signals (for example, the first sound signals $S_{11}$ and successive second sound signals $S_{21}$ described hereinafter) to an ambient environment of the electronic device 1. Referring to FIG. 2, when a volumetric region of interest 2 (for example, an auricle or an eye socket that includes a cavity structure) of an audience is positioned adjacent to the electronic device 1 (for example, when the audience holds the electronic device 1 to listen and talk during a phone call), the sound signals are propagated towards the volumetric region of interest 2. A portion of the sound signals hit and are reflected by the volumetric region of interest 2, to form echo signals (for example, the first echo signals $S_{12}$ and the successive second echo signals $S_{22}$ described hereinafter). The sound receiver 20 collects the echo signals from the volumetric region of interest 2.

In an embodiment, the sound generator 10 and the sound receiver 20 are transmitter and receiver of an ultrasound probing unit, respectively. The sound signals are generated by vibrations generated by the transmitter of the ultrasound probing unit. In another embodiment, the sound generator 10 is a speaker that can generate sound. The sound receiver 20 can be a microphone.

Figure 3:
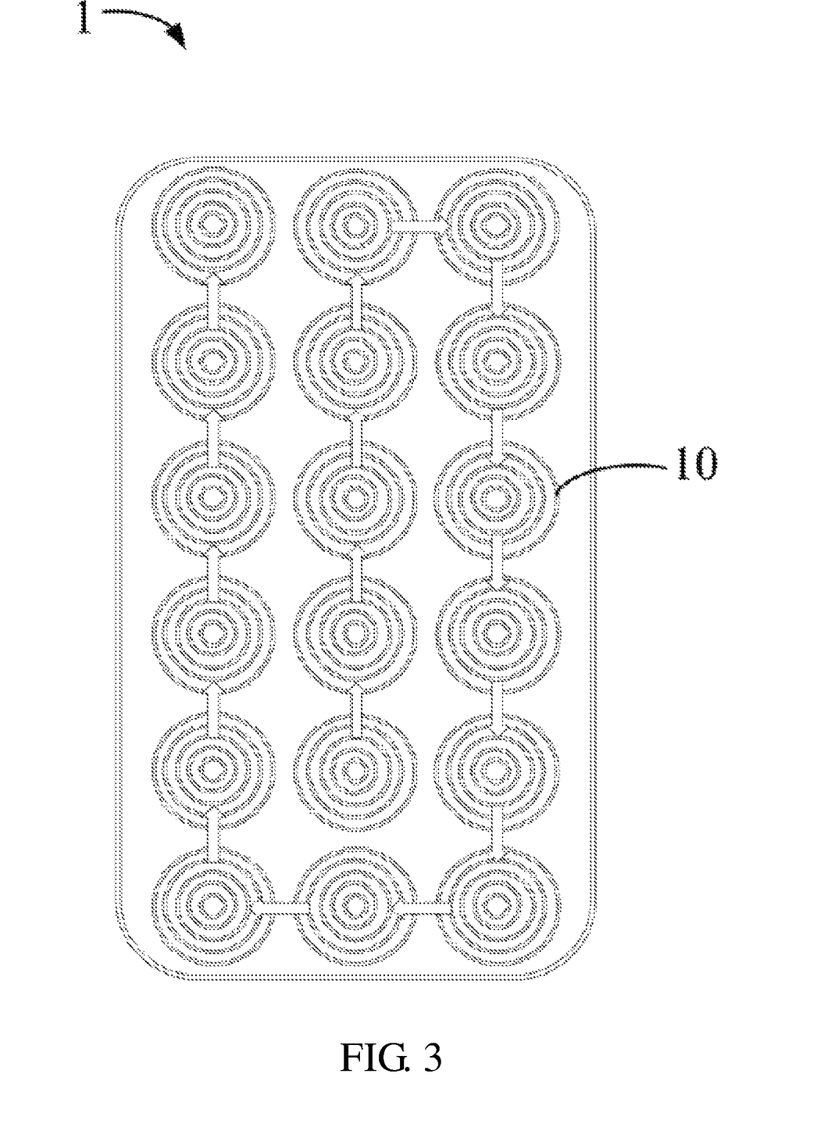
FIG. 3 is a diagrammatic view of sound generators of the electronic device of FIG. 1.

In one embodiment, the sound generator 10 is the vibration generator, referring to FIG. 3, the sound generators 10 are arranged in a matrix. In this embodiment, 18 of the sound generators 10 are arranged in a 6×3 matrix. The sound generators 10 orderly output the sound signals in the order shown by the arrows in FIG. 3.

Referring to FIG. 1, the electronic device 1 further includes a memory 30 and a processor 40. The memory 30 stores a system 100 for unlocking the electronic device and adjusting sound. The system 100 comprises a number of modules, which are a collection of software instructions executable by the processor 40 to perform the function of the system 100. In an embodiment, the memory 30 can be an internal storage device built inside the electronic device 1. In other embodiments, the memory 30 can be an external storage device removably connected to the electronic device 1. In one embodiment, the memory 30 can be a smart media card, a secure digital card, or a flash card. The processor 40 can be a central processing unit, a microprocessor, or any other suitable chip having data processing function.

Figure 4:
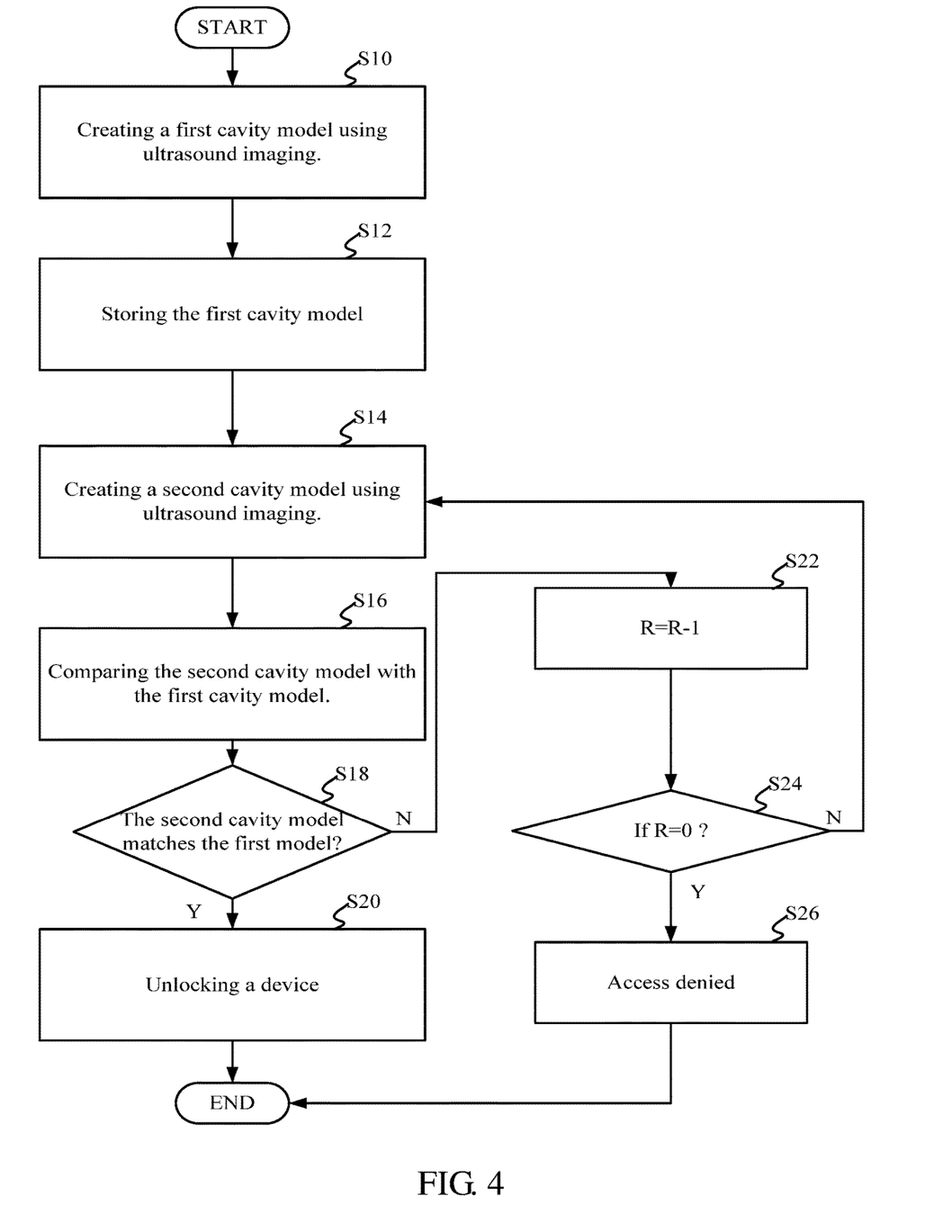
FIG. 4 is a block diagram of an embodiment of an electronic device unlocking method utilizing ultrasound imaging of the disclosure.

With reference to FIG. 4, the processor 40 in the electronic device 1 executes an embodiment of the device unlocking method. The processor 40 creates a first cavity model using ultrasound imaging (step S10) and stores the first cavity model (step S12). The ultrasound imaging in step S10 is referred to as a first ultrasound imaging process. The processor 40 utilizes the matrix of sound generators 10 to output ultrasound waves to a volumetric region of interest, and receive echo ultrasound sound waves from the sound receiver 20. The output ultrasound waves propagate, hit, and are reflected from the volumetric region of interest, such as an ear canal of a user in the first ultrasound imaging process. The volumetric region of interest may be another part of the user, such as an eye socket of the user in the first ultrasound imaging process. The volumetric region of interest, such as an ear canal, includes a cavity structure. The electronic device 1 utilizes a cavity structure detected in the first ultrasound imaging process for biometrics authentication. Specifically, the cavity structure of the user detected in the first ultrasound imaging process may be stored in the memory 30 and forms a basis for similarity comparison with other ultrasound detected cavity structures. The echo ultrasound sound waves may be a part of the output ultrasound wave bounced from the surface of the volumetric region of interest. The processor 40 obtains first ultrasound image data from the received echo ultrasound sound waves and obtains a first cavity model from the first ultrasound image data. The first cavity model represents the volumetric region of interest, such as an ear canal, including a cavity structure of the user in the first ultrasound imaging process. Specifically, ultrasound image data representing the first cavity model of the user in the first ultrasound imaging process may be stored in the memory 30, and forms a basis for similarity comparison with other ultrasound detected cavity models.

The processor 40 creates a second cavity model using ultrasound imaging and stores the second cavity model (step S14). The ultrasound imaging in step S14 is referred to as a second ultrasound imaging process. The processor 40 utilizes the matrix to the sound generators 10 to a volumetric region of interest, and receive echo ultrasound sound waves from the sound receiver 20. The output ultrasound waves propagate, hit, and are reflected from the volumetric region of interest, such as an ear canal of a user in the second ultrasound imaging process. The volumetric region of interest may be another part of the user, such as an eye socket of the user in the second ultrasound imaging process. The volumetric region of interest, such as an ear canal, includes a cavity structure. The electronic device 1 utilizes the ultrasound detected cavity structure in the second ultrasound imaging process for biometrics authentication. The echo ultrasound sound waves may be a part of the output ultrasound wave bounced from the surface of the volumetric region of interest. The processor 40 obtains second ultrasound image data from the received echo ultrasound sound waves and obtains a second cavity model from the second ultrasound image data. The second cavity model represents the volumetric region of interest, such as an ear canal, including a cavity structure of the user in the second ultrasound imaging process.

The processor 40 compares the second cavity model with the first cavity model and determines similarity between the second cavity model and the first cavity model (step S16). The processor 40 performs device unlocking to unlock the electronic device 1 in a condition that similarity between the second cavity model and the first cavity model exceed a similarity threshold (step S20). In other words, the processor 40 determines the second cavity model matches the first cavity model when the difference between the second cavity model and the first cavity model is less than a tolerance level, and performs device unlocking.

When similarity between the second cavity model and the first cavity model does not exceed the similarity threshold, the processor 40 does not perform device unlocking and counts down a variable R (step S22). In other words, the processor 40 determines the second cavity model does not match the first cavity model when the difference between the second cavity model and the first cavity model is greater than the tolerance level, and counts down device unlocking challenging rounds. The variable R represents a number of challenge rounds and may be preset to an integer number, such as three. The processor 40 determines whether the R has been counted down to zero (step S24) and denies user access to the electronic device 1 when the R has been counted down to zero (step S26). The processor 40 repeats the step S14 when the R is not zero.

Figure 5:
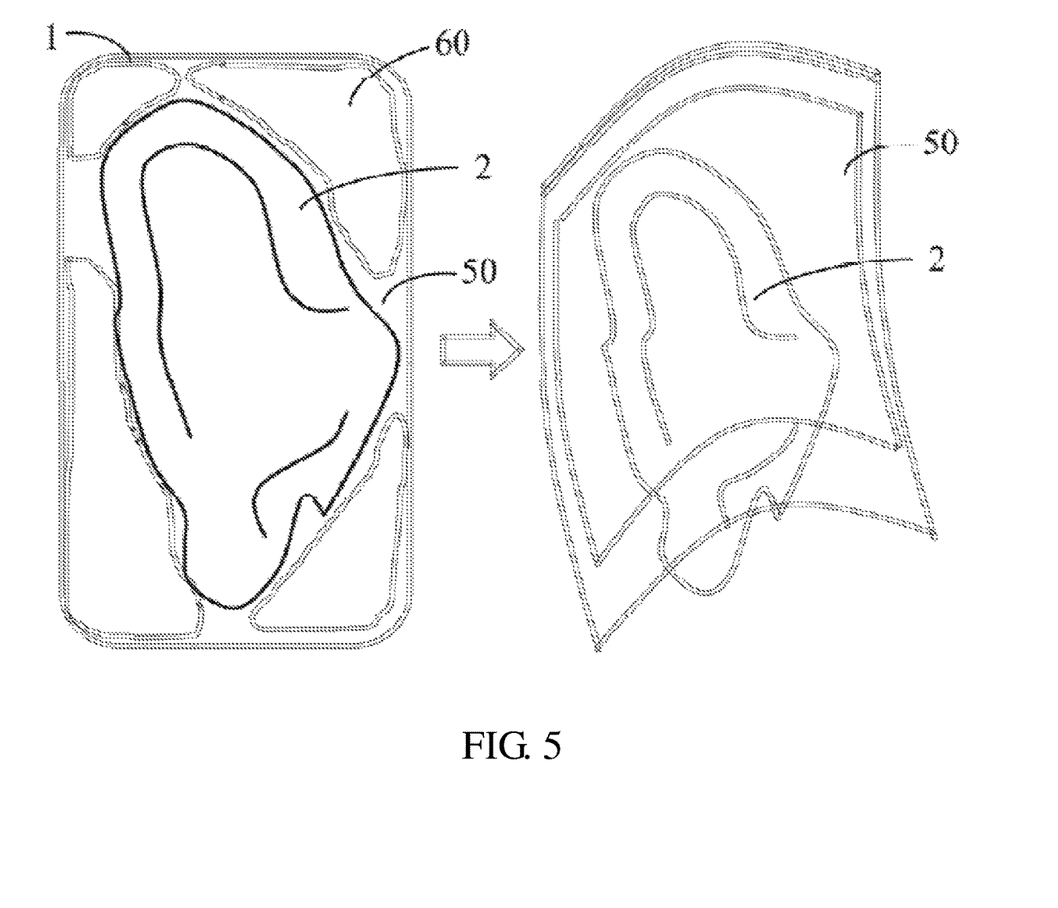
FIG. 5 is a diagrammatic view of deformation areas of the electronic device of FIG. 1.

Referring to FIGS. 1 and 5, the electronic device 1 further includes a flexible panel 50, a number of deformation areas 60, and a gas generator 70. The deformation areas 60 are positioned under the flexible panel 50 and along edges of the flexible panel 50. Each deformation area 60 can be a gas bag. The gas generator 70 is connected to each deformation area 60. When the gas generator 70 inputs gas in the deformation area 60, the deformation area 60 deforms, and thus the flexible panel 50 deforms. Thus, when the audience places the auricle adjacent to the flexible panel 50, the deformed deformation area 60 can be adapted to and even wrap around the auricle.

Figure 8:
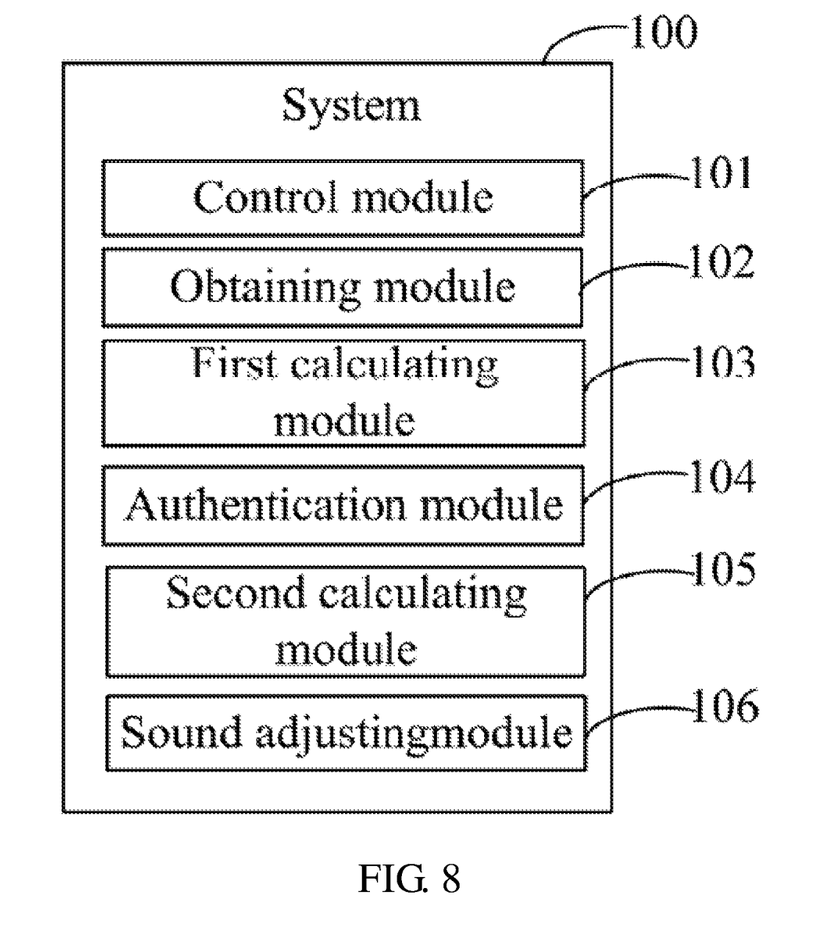
FIG. 8 is a block diagram of an embodiment of a system for adjusting sound.

Referring to FIG. 8, the system 100 includes a control module 101, an obtaining module 102, a first calculating module 103, an authentication module 104, a second calculating module 105, and a sound adjusting module 106.

Figure 9:
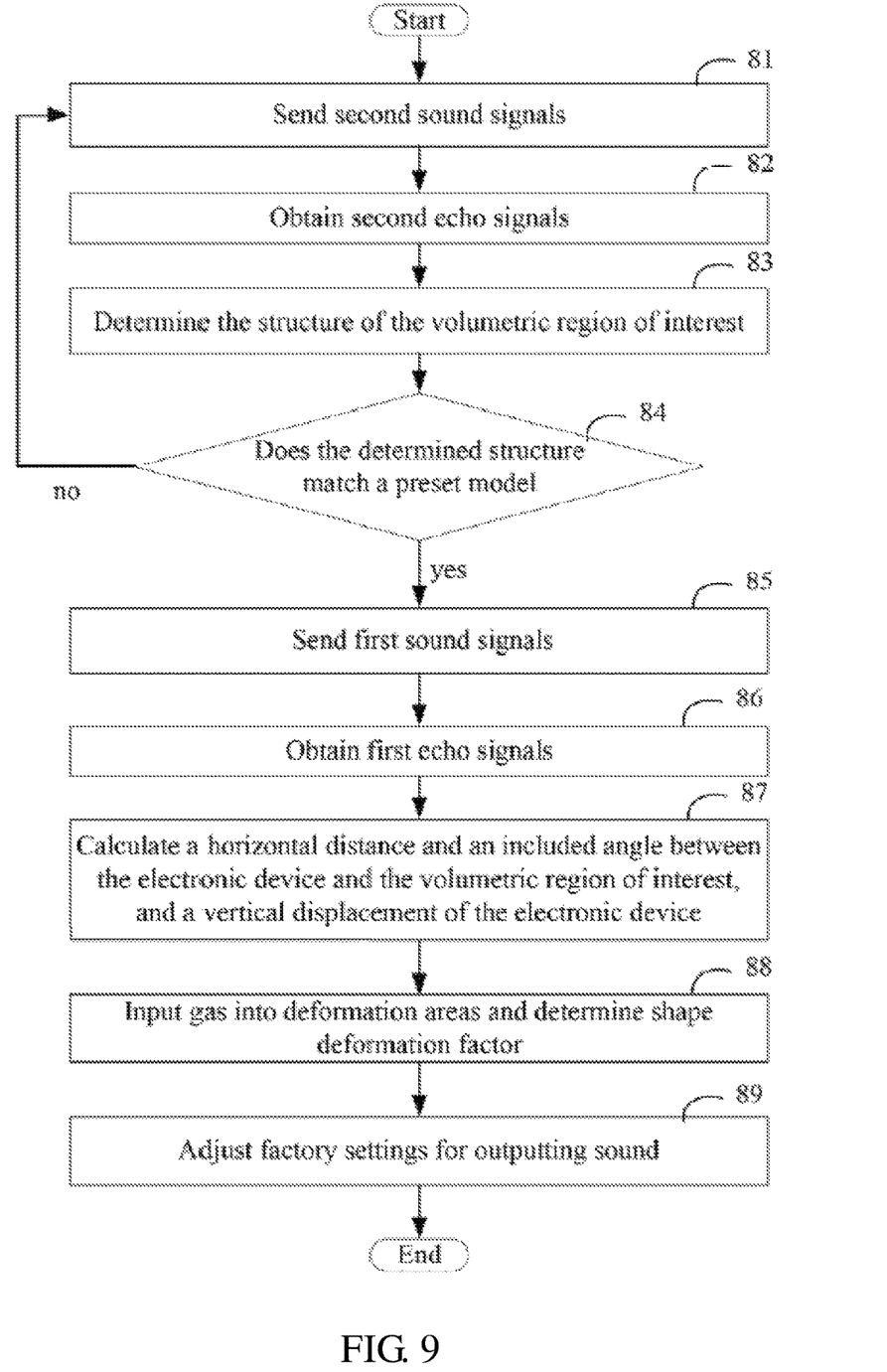
FIG. 9 is a flowchart of an embodiment of a sound adjusting method.

FIG. 9 illustrates an embodiment of a method for adjusting sound. The method is provided by way of embodiments, as there are a variety of ways to carry out the method. Each block shown in FIG. 9 represents one or more processes, methods, or subroutines, carried out in the example method. Furthermore, the illustrated order of blocks is illustrative only and the order of the blocks can change. Additional blocks can be added or fewer blocks may be utilized or the order of the blocks may be changed, without departing from this disclosure. The method can begin at block 81.

At block 81, the control module 101 controls the sound generators 10 to send successive sound signals (hereinafter, the second sound signals $S_{21}$). The second sound signals $S_{21}$ are propagated towards the volumetric region of interest 2. A portion of the second sound signals $S_{21}$ hit and are reflected by the volumetric region of interest 2, to form the echo signals (hereinafter, the second echo signals $S_{22}$).

In an embodiment, the second sound signals $S_{21}$ can have same or different sound characteristics. For example, when the second sound signals $S_{21}$ are generated by vibrations, the second sound signals $S_{21}$ can have different amplitudes of vibrations. When the second sound signals $S_{21}$ are music signals, the second sound signals $S_{21}$ can have different frequencies and amplitudes.

At block 82, the obtaining module 102 obtains the second echo signals $S_{22}$ from the sound receiver 20.

Referring to FIG. 2, in an embodiment, the volumetric region of interest 2 is the auricle of the audience. Since each auricle may have individual shape and structure, the second echo signals $S_{22}$ reflected by the auricle may be individualized, which allows the second echo signals $S_{22}$ to be used to identify different auricles for biometric authentications.

At block 83, the first calculating module 103 calculates structural characteristics of the volumetric region of interest 2 according to the second echo signals $S_{22}$, and determines the structure of the volumetric region of interest 2 according to the calculated structural characteristics.

Figure 6:
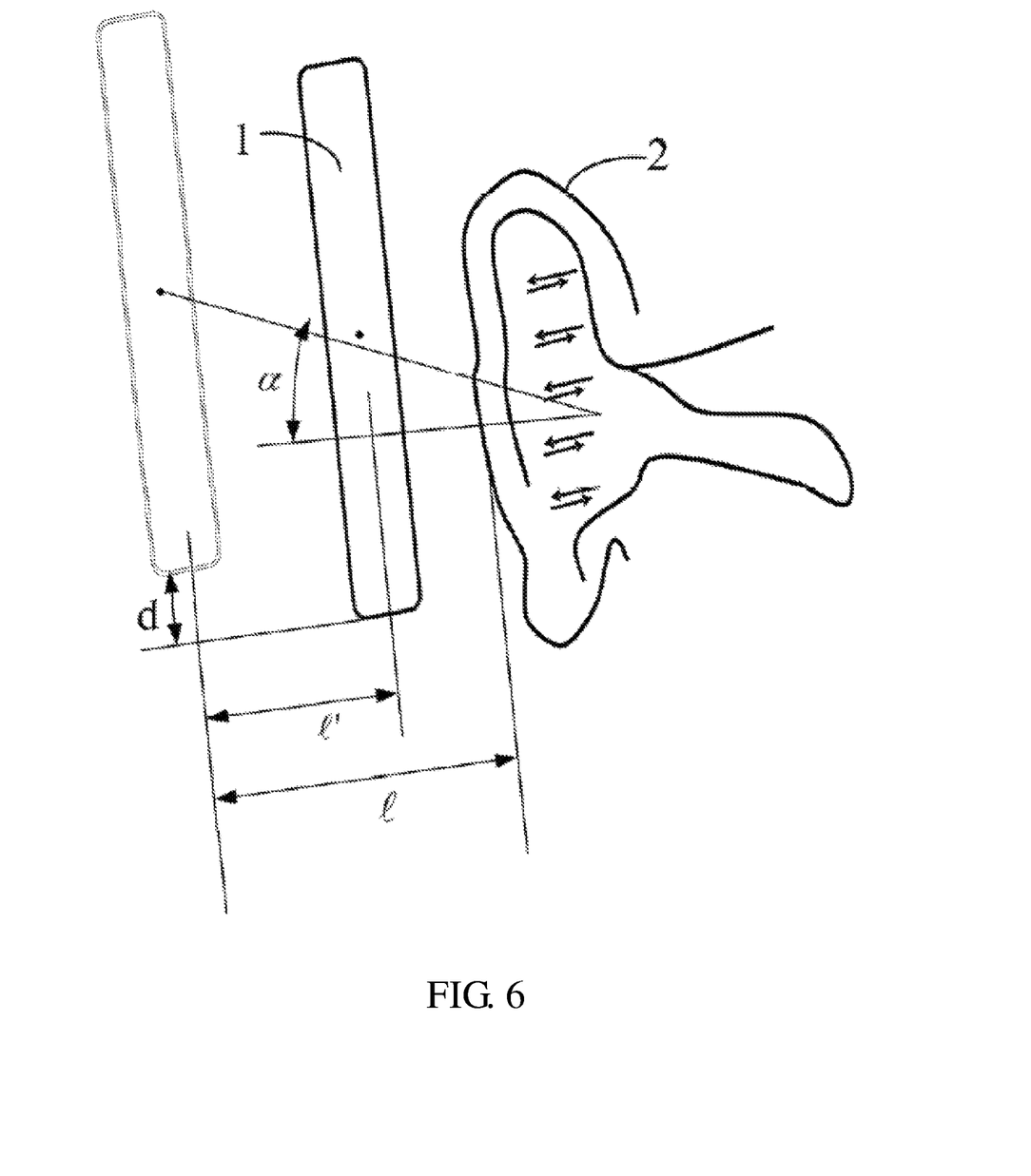
FIG. 6 is a diagrammatic view showing movement between the electronic device and the auricle of FIG. 2.

Referring to FIG. 6, the second echo signals $S_{22}$ hitting and being reflected by a point (detecting point) of the volumetric region of interest 2, the greater of the horizontal distance λ between the electronic device 1 and the detecting point, the greater is of the intensity attenuation of the second echo signals $S_{22}$ with respect to the second sound signals $S_{21}$. Thus, in an embodiment, the first calculating module 103 can calculate the horizontal distance λ according to the intensity attenuation of the second echo signals $S_{22}$ with respect to the second sound signals $S_{21}$. In another embodiment, the first calculating module 103 can calculate the horizontal distance λ according to the time delay of the second echo signals $S_{22}$ with respect to the second sound signals $S_{21}$. By calculating the horizontal distances λ between the electronic device 1 and a number of detecting points, the distribution of the detecting points are obtained. Then, the first calculating module 103 can determine the structure of the volumetric region of interest 2.

Figure 7:
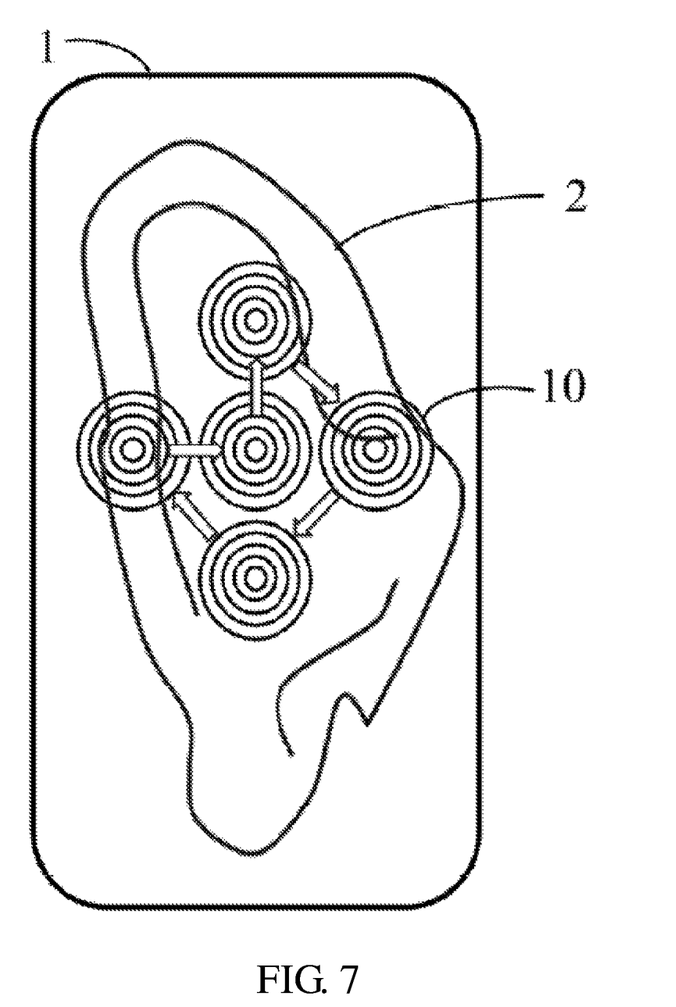
FIG. 7 is diagrammatic view illustrating an operation principle of the sound generators of FIG. 3.

Furthermore, referring to FIG. 7, the control module 101 controls the sound generators 10 spirally arranged to orderly send the second sound signals $S_{21}$. The detecting points that reflect the second sound signals $S_{21}$ are also spirally arranged. In another embodiment, the control module 101 can also control randomly-arranged sound generators 10 to orderly send the second sound signals $S_{21}$.

At block 84, the authentication module 104 determines whether the structure determined by the first calculating module 103 matches a preset model. If yes, the procedure proceeds to block 85, otherwise block 81 is repeated.

In an embodiment, the authentication module 104 determines a similarity between the determined structure and the preset model, and compares the determined similarity with a similarity threshold. When the determined similarity is greater than the similarity threshold, the authentication module 104 can determine that the determined structure matches the preset model and give authentication.

At block 85, the control module 101 controls the sound generators 10 to send successive sound signals again (hereinafter, the first sound signals $S_{11}$). The first sound signals $S_{11}$ are propagated towards the volumetric region of interest 2. A portion of the first sound signals $S_{11}$ hit and are reflected by the volumetric region of interest 2, to form the echo signals (hereinafter, the first echo signals $S_{12}$).

In an embodiment, when the determined similarity is greater than the similarity threshold, the authentication module 104 first determines whether the electronic device 1 is locked or unlocked. When the electronic device 1 is locked, the control module 101 unlocks the electronic device 1, and controls the sound generators 10 to send the first sound signals $S_{11}$. When the electronic device 1 is unlocked, the control module 101 directly controls the sound generators 10 to send the first sound signals $S_{11}$. The authentication module 104 can determine whether the electronic device 1 is locked according to the applications currently running or by the wallpapers currently displayed. The authentication module 104 can also determine whether the electronic device 1 displays a locking pattern, to determine whether the electronic device 1 is locked.

In another embodiment, the electronic device 1 can further include a timer (not shown). When the determined structure does not match the preset model and the electronic device 1 is unlocked, the control module 101 controls the timer to count down through a variable R. The variable R represents a number of challenge rounds and may be preset to an integer number, such as three. When the variable R has been counted down to zero, the control module 101 locks the electronic device 1 to deny the audience access to the electronic device 1.

At block 86, the obtaining module 102 obtains the first echo signals $S_{12}$ from the sound receiver 20.

At block 87, referring to FIG. 6, the second calculating module 105 calculates the horizontal distance λ between the electronic device 1 and the volumetric region of interest 2 according to the first echo signals $S_{12}$. An included angle α between the electronic device 1 and the volumetric region of interest 2, and a vertical displacement d of the electronic device 1, is also calculated according to the first echo signals $S_{12}$. The second calculating module 105 further calculates a difference λ' in horizontal distance (that is, a difference λ' between the calculated horizontal distance λ and a historical horizontal distance). The historical horizontal distance can be a horizontal distance λ previously calculated by the second calculating module 105. A movement of the electronic device 1 in relation to the volumetric region of interest 2 may cause Doppler Effect. The second calculating module 105 further calculates a Doppler factor D according to the calculated horizontal distance λ, the calculated included angle α, and the calculated vertical displacement d. Such a determination/estimation of the Doppler factor is known in the art.

The calculated horizontal distance λ is a distance between a reference plane of the electronic device 1 and the volumetric region of interest 2 along a direction perpendicular to the electronic device 1. The calculated included angle α is an included angle between an imaginary line connecting the electronic device and the volumetric region of interest 2 and the direction perpendicular to the electronic device 1. The calculated vertical displacement d is a displacement of the electronic device 1 along a direction parallel to the reference plane of the electronic device 1. The reference plane can be a center plane of the electronic device 1 between the flexible touch panel 50 before deformation and the back cover (not labeled).

Since the structure of the volumetric region of interest 2 is constant, when a relative movement occurs between the electronic device 1 and the volumetric region of interest 2 (for example, when the audience moves the electronic device 1 towards the top left direction as shown in FIG. 6), the spatial position of the electronic device 1 with respect to the volumetric region of interest 2 changes. Then, the sound characteristics of the first echo signals $S_{12}$ with respect to the first sound signals $S_{11}$, such as the intensity attenuation or the time delay, also change accordingly. That is, the sound characteristics of the first echo signals $S_{12}$ are related to the spatial position of the electronic device 1 with respect to the volumetric region of interest 2. Thus, the second calculating module 105 can calculate the horizontal distance λ, the included angle α, and the vertical displacement d according to the sound characteristics of the first echo signals $S_{12}$.

At block 88, the control module 101 controls the gas generator 70 to input gas into the deformation areas 60 to cause the deformation areas 60 to deform. In an embodiment, the memory 30 stores a preset gas inputting region. The preset range can be designed by actual use. In one embodiment, the preset gas inputting region can be designed by the extent to which the deformation areas 60 wrap the auricle. The control module 101 can select one gas inputting amount from the preset gas inputting region, and control the gas generator 70 to input gas into the deformation areas 60 according to the selected gas inputting amount. The deformation amount of the deformation areas 60, which can be characterized by a shape deformation factor S, depends on the amount of gas input and the material of the deformation areas 60, and can be determined by a relationship between different deformation amounts and gas inputting amounts. The control module 101 further determines the shape deformation factor S of the deformation areas 60 according to the selected gas inputting amount and the relationship. The deformation amount of the deformation areas 60 can affect the actual audio output by the electronic device 1. For example, the greater of the deformation amount, the more the audio effect will impact the user.

At block 89, the sound adjusting module 106 adjusts original factory settings of the electronic device 1 for outputting sound according to the calculated difference $\lambda'$, the calculated included angle $\alpha$, the calculated Doppler Effect D, and the shape deformation factor S. The adjusted factory settings can be described by function $F(\lambda', \alpha, D, S)$:

$$F(\lambda', \alpha, D, S) = \frac{D\cos^2(\alpha) f_{sp}(\lambda')}{S}$$

Wherein, $f_{sp}(\lambda')$ represents the original factory settings of the electronic device 1 for outputting sound. The original factory settings include default sound data such as default volume or default frequency for outputting sound.

In other embodiments, blocks 81~84 for user authentication can be omitted. That is, the control module 101 can first control the sound generators 10 to send the first sound signals $S_{11}$.

With the above configuration, since the factory settings of the electronic device 1 for outputting sound are adjusted according to the calculated difference $\lambda'$, the calculated included angle $\alpha$, the calculated Doppler Effect D, and the shape deformation factor S, the electronic device 1 can impart better sounds to the audience to improve the experience.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device unlocking method utilizing ultrasound imaging executable by the electronic device, comprising:
    creating a first cavity model using ultrasound imaging;
    storing the first cavity model;
    creating a second cavity model using ultrasound imaging;
    determining similarity between the second cavity model and the first cavity model; and
    performing device unlocking in a condition that similarity between the second cavity model and the first cavity model exceeds a level.

2. The method as claimed in claim 1, further comprising:
    using a matrix of sound generators to output ultrasound waves to a volumetric region of interest;
    using a sound receiver to receive echo ultrasound waves;
    obtaining ultrasound image data associated with the first cavity model from the received echo ultrasound waves; and
    obtaining the first cavity model from the ultrasound image data.

3. The method as claimed in claim 1, wherein the matrix of sound generators is located on a flexible panel.

4. The method as claimed in claim 3, wherein the electronic device further comprising a plurality of deformation areas positioned under the flexible panel, and a gas generator connected to the plurality of deformation areas, the method further comprising:
    after performing device unlocking, controlling the gas generator to input gas into the plurality of deformation areas to deform the plurality of deformation areas.

5. A device comprising:
    sound generators;
    a sound receiver and
    a processor operable to execute a unlocking method comprising:
    using the sound generators and the sound receiver to execute a first ultrasound imaging;
    creating a first cavity model through the first ultrasound imaging;
    storing the first cavity model;
    using the sound generators and the sound receiver to execute a second ultrasound imaging;
    creating a second cavity model through the second ultrasound imaging;
    determining similarity between the second cavity model and the first cavity model; and
    performing device unlocking in a condition that similarity between the second cavity model and the first cavity model exceeds a level.

6. The device as claimed in claim 5, wherein the sound generators are arranged in a matrix, and the unlocking method further comprises:
    using the matrix of the sound generators to output ultrasound waves to a volumetric region of interest;
    using the sound receiver to receive echo ultrasound waves;
    obtaining ultrasound image data associated with the first cavity model from the received echo ultrasound waves; and
    obtaining the first cavity model from the ultrasound image data.

7. The device as claimed in claim 5, wherein the matrix of the sound generators are located on a flexible panel.

8. The device as claimed in claim 5, wherein the electronic device further comprising a plurality of deformation areas positioned under the flexible panel, and a gas generator connected to the plurality of deformation areas, and the processor further executes:
    after performing device unlocking, controlling the gas generator to input gas into the plurality of deformation areas to deform the plurality of deformation areas.

* * * * *